United States Patent [19]

McFarlane et al.

[11] Patent Number: 4,941,100

[45] Date of Patent: Jul. 10, 1990

[54] AUTOMATIC EDGER SAW

[76] Inventors: Arthur M. G. McFarlane, 1873 Redman Rd., Hamlin, N.Y. 14464; Stuart R. McFarlane, 1 Craig Hill Dr., Brockport, N.Y. 14420

[21] Appl. No.: 278,279

[22] Filed: Nov. 30, 1988

[51] Int. Cl.⁵ .......................... G06F 15/46; B27B 7/02
[52] U.S. Cl. .................. 364/474.09; 83/76.8; 83/364; 83/368; 144/357; 144/377
[58] Field of Search ............... 83/71, 72, 74, 75, 433, 83/435.1, 404.1, 703, 364, 365, 368, 370, 76.1, 76.6–76.8, 72, 75; 144/378, 357, 377, 356; 364/474.15, 474.09

[56] References Cited

U.S. PATENT DOCUMENTS

| | | | |
|---|---|---|---|
| 4,077,448 | 3/1978 | Hasenwinkle et al. | 83/433 X |
| 4,139,035 | 2/1979 | Bystedt et al. | 83/71 X |
| 4,188,544 | 2/1980 | Chasson | 144/357 X |
| 4,207,472 | 6/1980 | Idelsohn et al. | 144/357 X |
| 4,281,696 | 8/1981 | Howard et al. | 83/71 X |
| 4,383,561 | 5/1983 | Gregoire et al. | 144/357 X |
| 4,449,557 | 5/1984 | Mäkelä et al. | 144/378 X |
| 4,458,567 | 7/1984 | Tuomaala | 144/378 X |
| 4,532,842 | 8/1985 | McFarlane | 83/404.1 |
| 4,879,659 | 11/1989 | Bowlin et al. | 364/474.09 X |

*Primary Examiner*—Frank T. Yost
*Assistant Examiner*—Rinaldi Rada
*Attorney, Agent, or Firm*—Cumpston & Shaw

[57] ABSTRACT

A controller for a head rig edger saw for sawing the edges of a board that is cut from a log by a head saw includes a detector for determining the surface contour of the log to be sawed, along a line displaced from the face of the log; a computer device for selecting an edger saw line through the log from the surface contour to produce a board satisfying predetermined criteria; and an edger saw controller connected to the computing device for providing control signals to the edger for causing the saw to cut the board along the selected line.

26 Claims, 3 Drawing Sheets

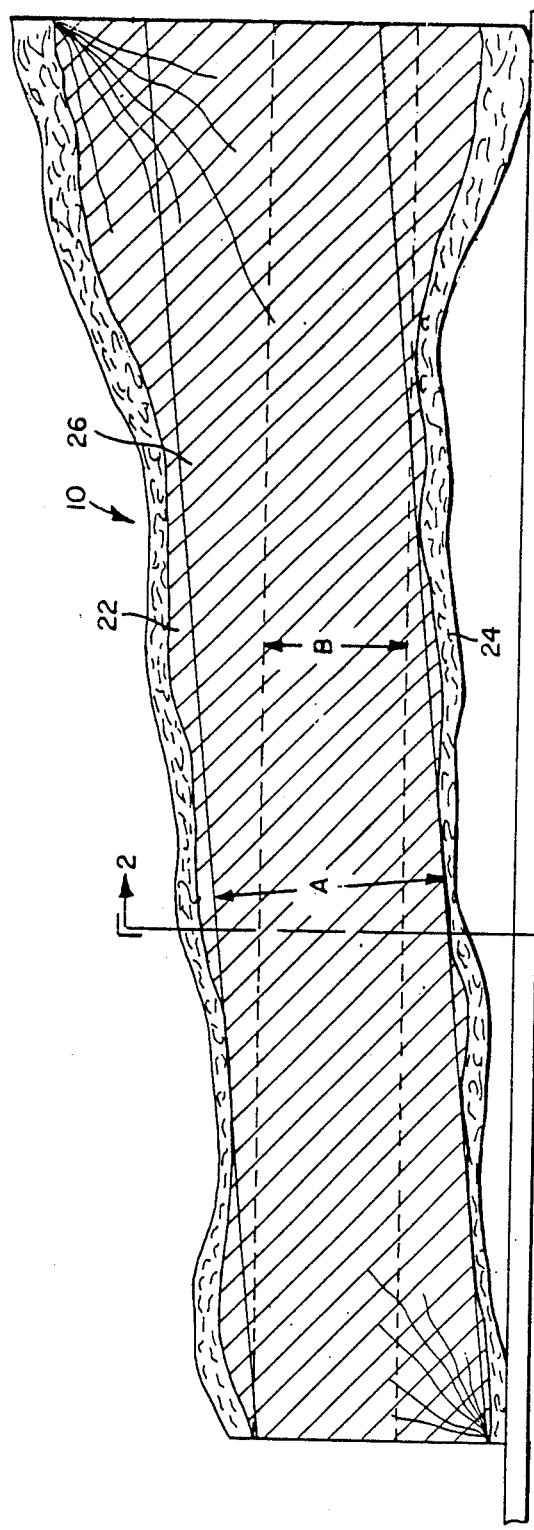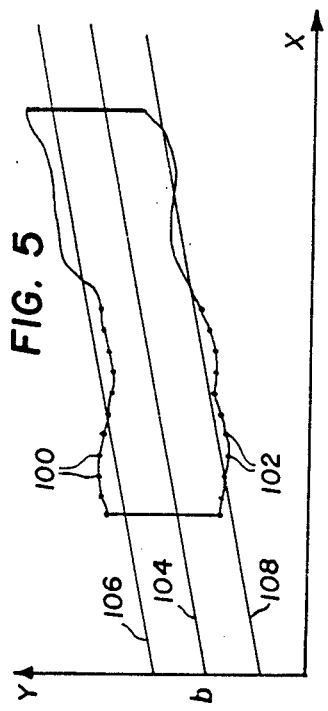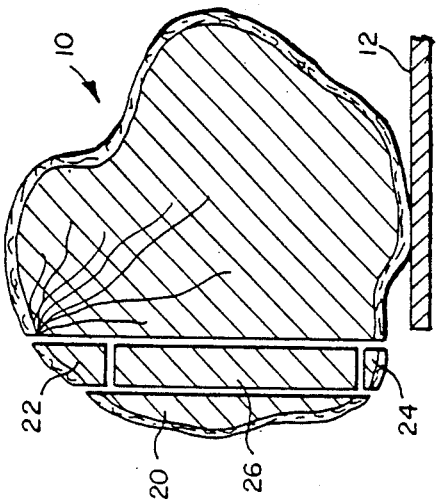

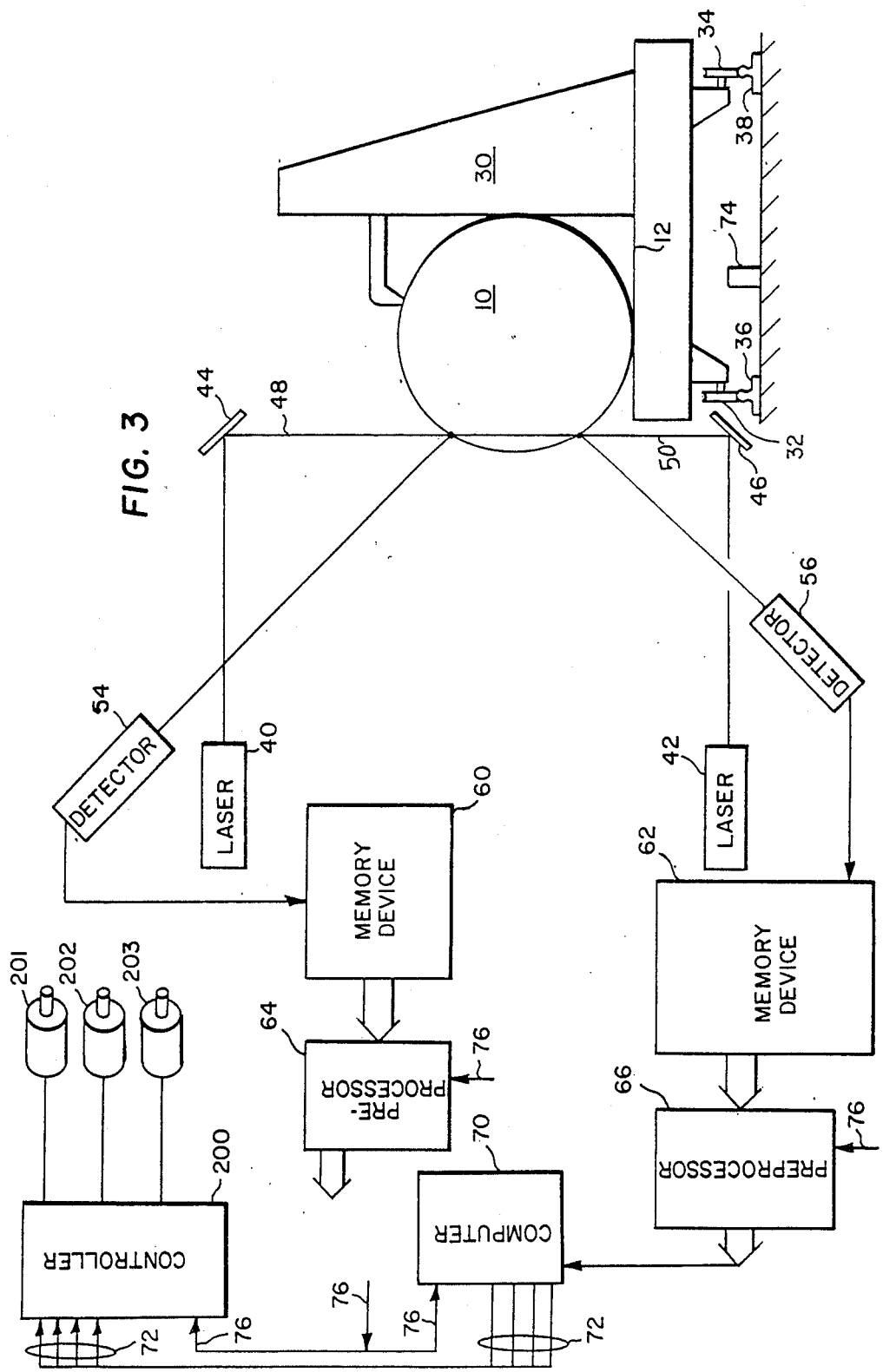

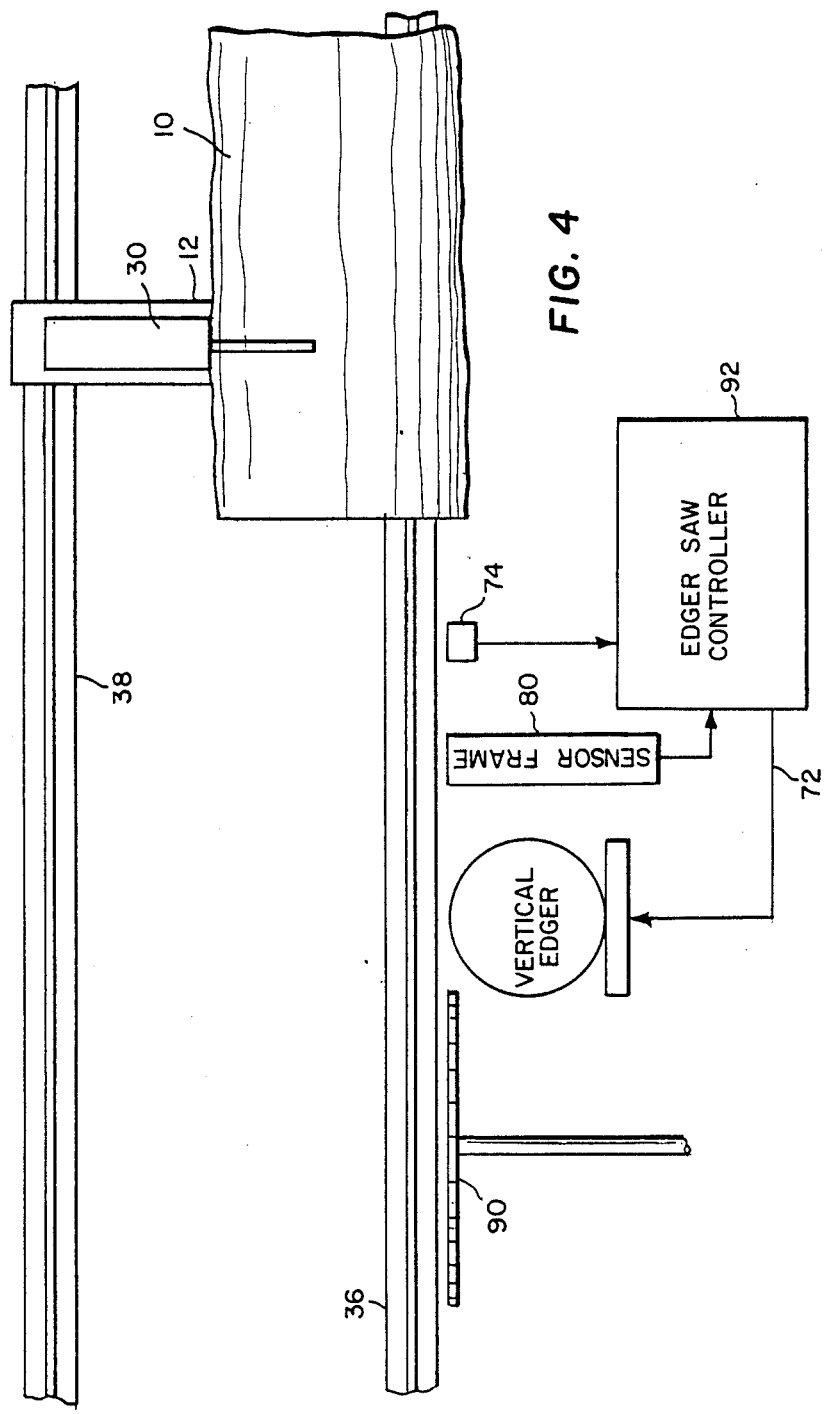

AUTOMATIC EDGER SAW

This invention relates generally to edgers and more particularly to an automatic head rig edger and a controller for such a edger.

McFarlane U.S. Pat. No. 4,532,842, the disclosure of which is incorporated herein by reference, describes an improved head rig edger saw that allows a better board to be cut from an irregular log than can be accomplished with conventional edger saws. The edger saw described in the patent can be adjusted to saw a board from a log with a width and at an angle that can be selected by the sawyer to make best use of a wide variety of logs, including logs that are irregularly shaped.

An experienced sawyer can greatly increase the yield from a particular log by using the edger saw described in the McFarlane patent.

Modern sawmills constantly strive to increase the rate at which they manufacture lumber from logs, and the quality of the lumber produced. The equipment used in a modern lumber manufacturing mill is capable of very high rates of operation. The tiltable head rig edger saw described in the McFarlane patent is likewise capable of high speed operation, but requires that the sawyer exercise judgment in setting the saw up prior to making each cut. An experienced sawyer can visually inspect a log and set up the saw rapidly, but even the small amount of time it takes to decide on the edger saw position, angle, and spacing, slows down the operation of the mill. Inexperienced sawyers may take even more time or, if rushed, may choose less than the optimum settings and produce a smaller or lower quality board than is optimum.

It is an object of this invention to provide an automatic head rig edger saw including a controller that will assist the sawyer in setting up an edger saw to saw the best possible board from a log. The automatic edger saw of this invention can be used either in a semi-automatic mode by a sawyer who will make the final adjustments based on visual observation of the log and on his experience, or in an automatic mode. In the automatic mode, an inexperienced sawyer can greatly improve the quality and speed at which he manufactures lumber.

As used herein, the term head rig edger saw refers not only to circular saws, but also to edger-chippers and other saws that accomplish similar results.

Briefly stated, and in accordance with the presently preferred aspect of this invention, a controller for an edger saw for sawing the edges of a board that as it is cut from a log by a head saw includes:
  inspection means for determining the surface contour of the log to be sawed, along a line displaced from the face of the log;
  calculating means for selecting an edger saw line through the log from the surface contour to produce a board satisfying predetermined criteria; and
  control means connected to the calculating means for providing control signals to the edger for causing the saw to cut the board along the selected line.

In accordance with another embodiment of this invention, the means for determining the surface contour of the log comprises a laser or other source of radiation for illuminating during one head saw pass, the top and bottom surfaces of the log along parallel lines lying in the plane of the next head saw pass through the log and sensor means for detecting a reflected beam for determining the surface contour.

In accordance with a further embodiment of this invention, the top and bottom surface contours of a log are determined at a plurality of discrete points on the log and the saw line is calculated by minimizing the sum of the squares of displacements of said points from the sawline.

While the novel aspects of the invention are set forth with particularity in the accompanying claims, the invention itself, together with further objects and advantages thereof, may be more readily understood by reference to the following detailed description of the preferred embodiment of the invention, taken in conjunction with the accompanying drawings, in which:

FIG. 1 is a side elevational view of a log during sawing in accordance with this invention;

FIG. 2 is a section taken along line 2—2 of FIG. 1, showing the log together with a bark segment and a board sawn from the log;

FIG. 3 is a diagramatic view of a controller for an edger saw in accordance with this invention;

FIG. 4 is a top plan view of a sawmill including an automatic edger in accordance with this invention; and FIG. 5 is a diagram showing the manner in which the edger saw angle and position are determined.

Referring now to FIGS. 1 and 2, an irregularly shaped log 10 is shown mounted on a bed 12 of a reciprocally movable log carriage. The reciprocal movement of logs to be sawn past a head saw on a carriage is conventional, and as such forms no part of this invention. As the log is repeatedly moved back and forth past the head saw to cut boards 28 therefrom, either the head saw or the log is indexed for successive cuts, by an amount equal to the thickness of the board, and the kerf. As shown in FIG. 2, it is conventional to remove a bark segment 20 from the log on the first pass prior to cutting any boards from the log. Thus no edger saw cut is required on the first pass. As will be appreciated more fully from the description that follows, data accumulated on the first pass, as on all subsequent passes of the log past the headsaw, determines the edger line for the next pass. Thus the second pass produces the first board as defined by the headsaw and head rig edger. During subsequent passes, the edger removes segments 22 and 24.

A controller for an edger saw in accordance with this invention is illustrated in diagramatic form in FIG. 3. Log 10 is shown as a cylindrical section for simplicity, but will be understood to be any arbitrarily shaped log. The log is supported on a reciprocally movable carriage 12 and held in place by hooks attached to a head block 30. By way of illustration only, the carriage 12 is shown supported by first and second wheels 32 and 34, that engages rails 36 and 38 mounted on the floor of the sawmill.

The remaining components are conveniently mounted on a scanner frame as shown in FIG. 4, but omitted from this figure for convenience. Upper and lower laser light sources 40 and 42 project a beam of light on to the surface of log 10 by way of mirrors 44 and 46. Mirrors 44 and 46 are arranged so that the upper and lower light beams 48 and 50 are aligned in the plane that the head saw (not shown) will take on the next pass. Thus, the lasers illuminate a line on the surface of log 10 that is displaced inwardly from the surface presently being cut by a distance approximately equal to the thickness of the next board to be cut, plus any saw kerf. Thus, during each pass of the log past the headsaw, the light sources trace the contour of the surface of the log in the plane of the next board to be cut.

The position of the contour line described by the laser light sources is detected at a plurality of points along the log by upper and lower video cameras 54 and 56 or other known detectors, which are aimed at the log. Preferably, the cameras are aligned with the light sources, and the position detected by each camera is the position of the reflected light along one of the upper and lower lines. The outputs of cameras 54 and 56 are stored temporarily in memory devices 60 and 62, each of which has the capability of storing a single video frame containing a single point on the contour of the log. The outputs of memory devices 60 and 62 are fed to preprocessors 64 and 66 respectively, which process the data from the memory devices to produce a series of data points that are applied to a computer 70. A position sensor 74 is coupled to carriage 12 and to an input 76 of each preprocessor for providing an indication of the position of the carriage, which, together with the data points allows the computation of edger saw path. The connection between sensor 74 and inputs 76 has been omitted for clarity. The computer 70 produces a series of outputs 72 for positioning an edger saw to saw a board from log 10.

The output signals of computer 70 are fed into edger position controller 200. Edger controller 200 is preferably a stand alone computer dedicated to positioning edger actuators 201, 202 and 203. Actuators of the type illustrated are themselves well known and per se form no part of this invention. Accordingly a detailed description of the edger controller and actuators is not included herein. Any combination of controller and actuators that will operate with signals required for safe predictable operation under automatic conditions may be used. A variation of this edger controller may be used for an edger/chipper mechanism. Actuators 201, 202 and 203 are used for position and angle of the edger mechanism.

The nature of the control signals provided by computer 70 to the edger saw will vary with the type of edger saw employed. For example, where an edger saw of the type described in U.S. Pat. No. 4,532,842 is employed, three values are sufficient to control the saw, namely the starting vertical position relative to the log; the angle of the cut; and the spacing between the upper and lower saws. Because the saws are self-guiding, it is not necessary to continuously supply position information to the saw. However, where an edger chipper is used, the edger is not self-guiding and in addition to the starting parameters mentioned above, it is necessary to provide continous position information, either from the controller or within the edger chipper itself, to produce ports having straight parallel edges.

FIG. 4 shows a top plan view of an edger saw and a controller in accordance with this invention. The upper and lower laser light sources and linear video cameras, together with the mirrors, all of which were shown in FIG. 3 are mounted on a sensor frame 80 positioned adjacent track 36. The edger saw is positioned between the sensor frame and head saw 90, which is shown as a circular saw, but which could also be a bandsaw. Edger saw controller 92 as shown in FIG. 4 will be understood to include memory devices 60 and 62, processors 64 and 66, as well as computer 70.

Once the contour of a log along the line where the next head saw cut will be made has been determined, it will be apparent that a variety of methods may be employed to determine the optimum edger saw path through the log. A presently Preferred method in accordance with this invention is to calculate the slope and access of the line representing the least squares approximation of the points on the contour that are acquired by the lasers and sensors. In the following discussion, X represents displacements along the length of the log, and Y represents the data points lying on the contour of the surface of the log.

Recalling that a line may be expressed in terms of its slope and Y intercept as: $y = mx + b$, the least squares solution is represented by the equations:

$$m\Sigma x_i^2 + b\Sigma x_i = \Sigma_i y_i$$
$$m\Sigma x_i + bn = \Sigma y_i$$

in which the summations are taken from $i = 1$, the first point along the contour to $i = N$, the final point.

These equations may be solved for the slope and intercept as follows:

$$m = \frac{((\Sigma(x_i y_i) * n) - (\Sigma x_i * \Sigma y_i))}{((\Sigma x_i^2 * n) - (\Sigma x_i)^2)}$$

$$b = \frac{((\Sigma x_i + \Sigma x_i y_i) - \Sigma x_i^2 * \Sigma y_i))}{((\Sigma x_i)^2 - n * (\Sigma x_i^2))}$$

Accordingly, the variables that the computer 70 needs to calculate the slope M and y intercept b are as follows:

| | |
|---|---|
| $\Sigma x_i$ | sum of x values from 1 to n |
| $\Sigma x_i y_i$ | sum of the x y products from 1 to n |
| $\Sigma y_{i2}$ | sum of the y values from 1 to n |
| $\Sigma x_i$ | sum of the x squared values from 1 to n |
| n | the number of data points |

While it would be apparent to those skilled in the art that a number of specific approaches to acquiring and processing the necessary data may be employed, the following is exemplary. The procedure is written in pseudo-code, which can be readily translated into any convenient computer language.

| Initialize variables Begin | |
|---|---|
| get current x position | ;carriage position |
| get upper y ($y_u$) value | ;upper edge data point |
| get lower y ($y_l$) value | ;lower edge data point |
| n = n + 2 | ;total number of points |
| $\Sigma x = \Sigma x + 2*x$ | ;sum of the x values |
| $\Sigma x^2 = \Sigma x^2 + 2*x^2$ | ;sum of the squares of x |
| $\Sigma y = \Sigma y + y_u + y_l$ | ;sum of the y values |
| $\Sigma xy = \Sigma xy + y_u x + y_l x$ | ;sum of the xy products |
| [ ]$y_u$ = [ ]$y_u$ concatenated with $y_u$ | ;add $y_u$ to the array of $y_u$'s |
| [ ]$y_l$ = [ ]$y_l$ concatenated with $y_l$ | ;add $y_l$ to the array of $y_l$'s |
| [ ]x = [ ]x concatenated with x until end of log | ;add x to the array of x's |

```
                        -continued
begin
  m = (Σxy*n − Σx*Σy)/(Σx²*n − (Σx)²)
  b = ((Σx + Σxy) − Σx²*Σy)/
      ((Σx)² − n*Σx²)
``` calculate upper and lower saw positions until done.

It will be appreciated that the foregoing procedure maximizes the speed of computation by allowing calculations to be carried on in real time as data is acquired from the instrumentation on the sensor frame, as the log passes by the sensors during a cut.

The step of calculating upper and lower saw positions is in effect calculated in the spacing between the saws, to produce a board having maximized quality or value. There are a variety of requirements for the grade of boards which can be used to determine the edger saw positions (spacing) for making the cut. For example, one quality of board requires that the wane be no more than one-third the width of the board in any location, and extend for no more than fifty per cent of the length of the board. The data gathered from the sensor frame is sufficient to calculate whether or not a board meets these requirements at any particular edger saw position, and it is preferred in accordance with this invention to iteratively select an edger saw position, calculate whether the board satisfies the criteria, and repeat until the criteria is met, or is within a predetermined acceptable error.

Preferably, the calculations are done for both the upper and lower edges concurrently with the acquisition of data from the sensor frame, and calculation of the angle of the saw. Thereby, when the log has passed the main saw, all data for the next position of the edger will have been calculated and can be applied to cut the next board from the face of the log.

FIG. 5 shows the various data points applied to an arbitrarily shaped log in diagramatic form.

The data points described above include a first plurality of points 100 lying on the upper contour of the log and a second plurality of points 102 lying on the lower contour. It will be understood that the plane through the log that contains these points is not on the edge of the sawn face of the log at the time the points are measured, but rather is displaced from the edge of the sawn face by the thickness of a board plus any kerf. These points are spaced apart on the x axis by increments measured by sensor 74.

The line 104 is the solution having a slope m and a y intercept b. Lines 106 and 108 are the upper and lower edger saw lines respectively. It will be appreciated that while the log is shown off set with respect to x and y by an arbitrary amount, the solution can be determined either with respect to the axes shown, or with respect to an x an y axis passing through the end surface of the log.

While the invention has been described in connection with the presently preferred embodiment thereof, those skilled in the art will understand that certain modifications and changes may be made without departing from the true spirit and scope of the invention, which is intended to be defined solely by the appended claims.

What is claimed is:

1. A controller for a head rig edger for edging a board as it is cut from a log characterized by an irregular surface contour by a head saw comprising:
   inspection means for determining the surface contour of the log to be sawed in the plane of the headsaw;
   calculating means responsive to said inspection means for selecting an edger line through said log to produce a board satisfying predetermined criteria; and
   control means connected to said calculating means for providing control signals to said edger for causing said edger to cut said board along said line.

2. The controller of claim 1 for an edger having two blades, wherein said inspection means comprises means for determining the surface contour of said log along two lines lying on the surface of said log at the intersections of said log and the plane of said head saw.

3. The controller of claim 1 wherein said inspection means comprises means for determining the surface contour of said log at a plurality of discrete points on said log.

4. The controller of claim 3 wherein said inspection means further comprises means for determining the longitudinal position of said log.

5. The controller of claim 4 wherein said calculating means comprises memory means for storing data representing the longitudinal position and surface contour of said log at said plurality of discrete points.

6. The controller of claim 5 wherein said calculating means comprises means for selecting said edger line by determining a line that passes through said plurality of discrete points according to a predetermined criteria.

7. The controller of claim 6 wherein said line passes through said plurality of discrete points so that the sum of the squares of the distances from said line to the points is minimized.

8. The controller of claim 1 wherein said control signals comprise vertical position signals and angle signals.

9. The controller of claim 1 wherein said inspection means comprises means for illuminating a surface of said log with a beam of radiation and means for detecting a reflected beam.

10. The controller of claim 9 wherein said means for illuminating the surface of said log with a beam of radiation comprises a coherent light source.

11. The controller of claim 10 wherein said means for detecting a reflected beam comprises an array of detectors.

12. The controller of claim 11 wherein said array of detectors comprises a video camera.

13. The controller of claim 11 wherein said array of detectors comprises a linear array camera.

14. A controller for a head rig edger for edging boards as they are cut from a log having an irregular surface by a head saw in a plurality of passes comprising:
   inspection means for determining during a pass of the log ever the head saw, the surface contour of a board to be sawed from the log during a subsequent pass of the log past the headsaw;
   calculating means responsive to said inspection means for selecting an edger line through said log to produce a board satisfying predetermined criteria; and
   control means connected to said calculating means for providing control signals to said edger for causing said edger to cut said board along said line during said subsequent pass of said log past the headsaw.

15. The controller of claim 14 for an edger having two blades, wherein said inspection means comprises means for determining the surface contour of said log along two lines lying on the surface of said log at the intersections of said surface and the plane of said head saw.

16. The controller of claim 14 where in said inspection means comprises means for determining the surface contour of said log at a plurality of discrete points on said log.

17. The controller of claim 16 wherein said inspection means further comprises means for determining the longitudinal position of said log.

18. The controller of claim 17 wherein said calculating means comprises memory means for storing data representing the position and surface contour of said log at said plurality of discrete points.

19. The controller of claim 18 wherein said calculating means comprises means for selecting said edger line by determining a line that passes through said plurality of discrete points according to predetermined criteria.

20. The controller of claim 19 wherein said line passes through said plurality of discrete points so that sum of the squares of the distances form said line to the points is minimized.

21. The controller of claim 14 wherein said control signals comprise vertical position signals and angle signals.

22. The controller of claim 14 wherein said inspection means comprises means for illuminating a surface of said log with a beam of radiation and means for detecting a reflected beam.

23. The controller of claim 22 where said means for illuminating the surface of said log with a beam of radiation comprises a coherent light source.

24. The controller of claim 23 wherein said means for detecting a reflected beam comprises a detector array.

25. The controller of claim 24 wherein said array of detectors comprises a video camera.

26. The controller of claim 24 wherein said array of detectors comprises a linear array camera.

* * * * *